(12) United States Patent
Bachert

(10) Patent No.: US 6,845,971 B2
(45) Date of Patent: Jan. 25, 2005

(54) STERILE HUMIDIFIER AND METHOD OF OPERATING SAME

(75) Inventor: Karl Bachert, Roslyn, NY (US)

(73) Assignee: Slant/Fin Corporation, Greenvale, NY (US)

( * ) Notice: Subject to any disclaimer, the term of this patent is extended or adjusted under 35 U.S.C. 154(b) by 270 days.

(21) Appl. No.: 09/883,847

(22) Filed: Jun. 18, 2001

(65) Prior Publication Data

US 2002/0190400 A1 Dec. 19, 2002

(51) Int. Cl.[7] .................................................. B01F 3/04
(52) U.S. Cl. ........................... 261/37; 261/66; 261/81; 261/92; 261/107; 261/DIG. 46; 210/138; 210/748; 422/24; 422/186.3
(58) Field of Search ............................. 261/37, 66, 81, 261/91, 92, 106, 107, DIG. 46, DIG. 48, DIG. 65; 210/100, 138, 198.1, 748, 764; 422/24, 186.3

(56) References Cited

U.S. PATENT DOCUMENTS

| | | | |
|---|---|---|---|
| 4,663,091 A | * | 5/1987 | Seo ............................... 261/81 |
| 5,133,044 A | | 7/1992 | Chiu |
| 5,217,607 A | * | 6/1993 | Dalton, III et al. ...... 422/186.3 |
| 5,783,117 A | | 7/1998 | Byassee et al. |
| 5,855,203 A | * | 1/1999 | Matter |
| 5,859,952 A | | 1/1999 | Levine et al. |
| 6,255,103 B1 | * | 7/2001 | Tamaoki et al. ............... 422/24 |

* cited by examiner

Primary Examiner—C. Scott Bushey
(74) Attorney, Agent, or Firm—Herbert Dubno

(57) ABSTRACT

A humidifier meters water into a chamber in which it is subjected to ultraviolet light for a predetermined period of time sufficient to destroy microorganisms whereupon the static quantity of water is transferred to a water dispersing unit which discharges the decontaminated water in a finely divided form into the environment.

19 Claims, 3 Drawing Sheets

STERILE HUMIDIFIER AND METHOD OF OPERATING SAME

FIELD OF THE INVENTION

Figure 1:
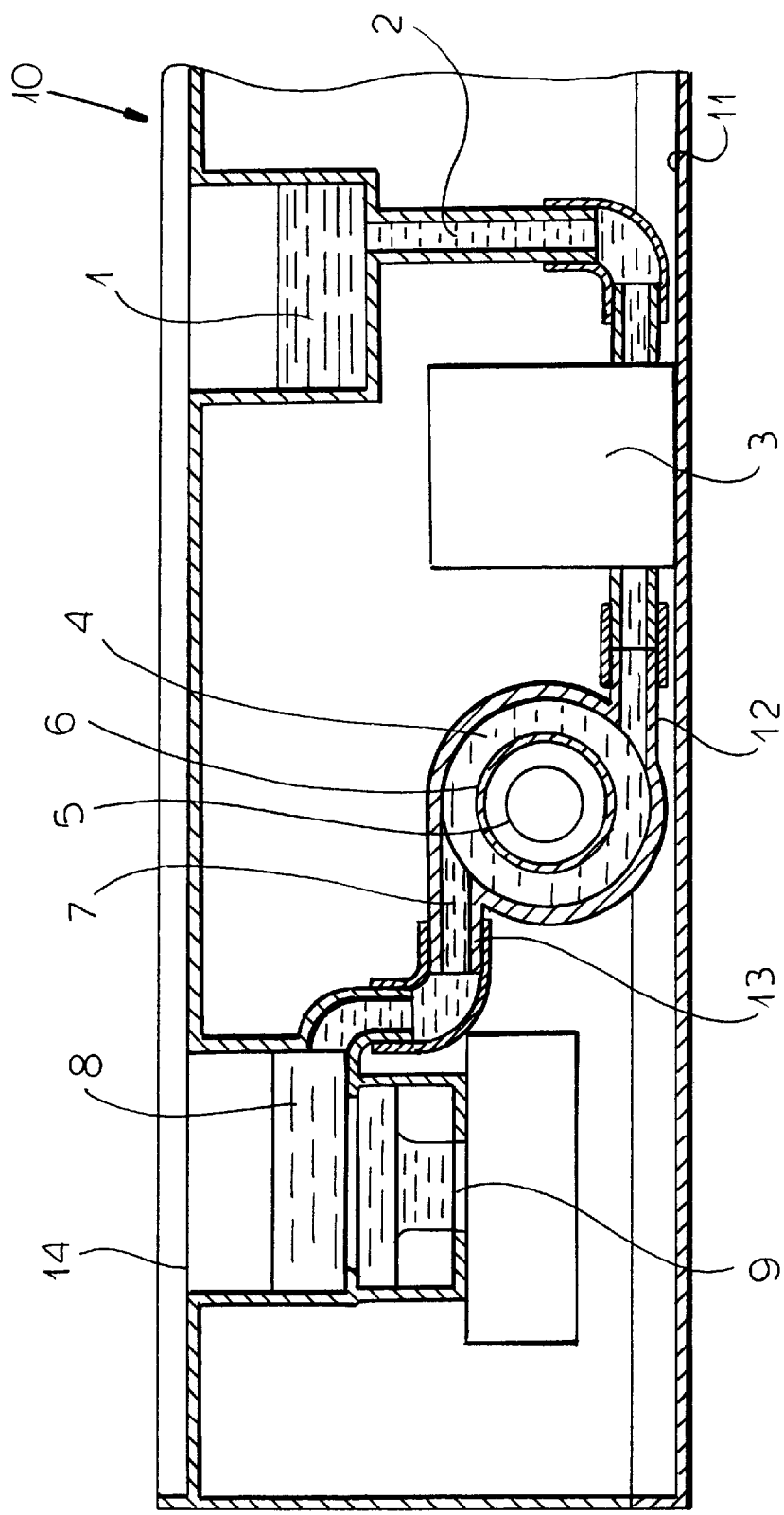

The present invention relates to a humidifier utilizing an anticontamination field, for example ultraviolet radiation, and to a method of operating such a humidifier.

BACKGROUND OF THE INVENTION

Commonly owned U.S. Pat. Nos. 5,859,952 and 5,677,982 disclose humidifiers with anticontamination utilizing ultraviolet radiation or UV. The water is dispersed, after it has been subjected to antimicrobial inactivation by the ultraviolet radiation via an ultrasonic atomizer, heater or wettable surface or filter over which or through which air can be passed. In that system the UV antimicrobial action takes place in a chamber through which the water passes and which has at least one window transparent to the UV radiation so that the water in the chamber can be exposed to the UV.

While this system has proved to be effective in practice, it is frequently desirable to afford greater assurance of the effectiveness of the antimicrobial field, namely, the ultraviolet radiation.

OBJECTS OF THE INVENTION

It is the principal object of the present invention to provide a humidifier with an anticontamination field, especially UV, which can ensure more effective UV decontamination than can be obtained with earlier systems.

Another object of the invention is to provide an improved method of operating a humidifier which has an antimicrobial or anticontamination effect.

It is also an object to provide a method of operating a humidifier and a humidifier operated by this method whereby the antimicrobial efficiency is increased and sterile water is dispersed into the environment without the need to heat the water to significant temperatures.

SUMMARY OF THE INVENTION

These objects are achieved, in accordance with the invention which is based upon the discovery that the disinfection or anticontamination effectiveness of a humidifier can be increased dramatically by controlling the volume of the water subjected to the decontamination field, i.e. the ultraviolet light, and the duration of treatment of that quantity of water. By contrast with prior systems in which the water flow through the chamber was practically continuous while the humidifier was in operation, with the present invention a metered quantity of water is subjected to the ultraviolet radiation before it is passed to the water dispersal unit.

More particularly, the method of operating the humidifier according to the invention can comprise the steps of:

(a) intermittently feeding water to a sterilization chamber;
(b) exposing water in the chamber to a sterilization field for a duration and of a magnitude sufficient to inactivate microorganisms in the water in the chamber; and
(c) thereafter dispersing the water from the chamber.

The humidifier itself can comprise:
a sterilization chamber;
a device for intermittently feeding water to the sterilization chamber;
a source of a sterilizing field at the chamber for exposing water in the chamber to the sterilization field for a duration and of a magnitude sufficient to inactivate microorganisms in the water in the chamber; and
a water disperser connected to the chamber for dispersing the water from the chamber into the surroundings.

While in principle substantially any dispersion of the water into the environment can be used, best results can be obtained when the dispersal is effected via an ultrasonic nebulizer, a rotary impeller or by filter, capillary or evaporation.

According to a feature of the invention, the amount of water is controlled by timing the inflow of the water to the chamber.

The inflow can be controlled by the timed operation of a solenoid or electromagnetic valve or by the controlled operation of a metering pump on the upstream side of the chamber.

It has been found to be advantageous to have the chamber configured as an annulus and surround the UV lamp.

The timing can be effected by the control circuitry for the humidifier.

All or part of the water path may be composed of or can contain elements composed of a synthetic resin material containing a biocide.

BRIEF DESCRIPTION OF THE DRAWING

The above and other objects, features, and advantages will become more readily apparent from the following description, reference being made to the accompanying drawing in which:

FIG. 1 is a diagrammatic cross sectional view of a humidifier embodying the principles of the present invention;

FIG. 2 is a circuit diagram for that humidifier;

FIG. 3 is a diagram showing another means of water dispersal; and

FIG. 4 is a diagram of still another water dispersal unit which can be used with the humidifier of FIG. 1.

SPECIFIC DESCRIPTION

The humidifier 10 shown in FIG. 1 can comprise a base 11 formed with a humidifier reservoir 1 which can be refilled from a tank mounted on the base and not shown. The water then flows through a tubing passage 2 until it reaches a solenoid valve or pump 3 which, when energized, will open in the case of the solenoid valve and allow a metered amount of water to flow into an ultraviolet light water chamber 4. In the case of a pump, a metered amount of water can be positively displaced via the meter 2 into the chamber 4. The decontamination chamber 4 is an annulus having a tangential inlet 12 and a tangential outlet 13 and is internally defined by a quartz wall 6 which may be a window transparent to UV light and through which the water in the chamber is exposed, or can be the wall of an ultraviolet light source itself. In the present case, the source is a germicidal ultraviolet bulb 5 which illuminates the water in the chamber 4 through the walls 6. The wavelength of the light from the germicidal UV bulb has been determined to kill the bacteria and other microorganisms and the water 7 in the outlet 13 is decontaminated.

The volume of water in the chamber 4 is selected for optimum microorganism destruction and the duration in the water chamber 4 is subjected to the ultraviolet light is such that at least a large proportion of the microorganisms which may be present in the water in the chamber 4 is destroyed.

At the end of this time period, the solenoid valve or pump 3 is operated so that the germicidally decontaminated water is delivered by tubing passage to an ultrasonic reservoir and provided with an ultrasonic nebulizer transducer. The transducer oscillates at a frequency which produces a water mist released into the air through the opening 14 and discharged, if desired, directionally or nondirectionally by a tube or duct surmounting the base 11. The water that enters the tank 8 has spent enough time in the chamber 4 exposed to ultraviolet light to ensure that a significant proportion of microorganisms are killed.

Figure 3:
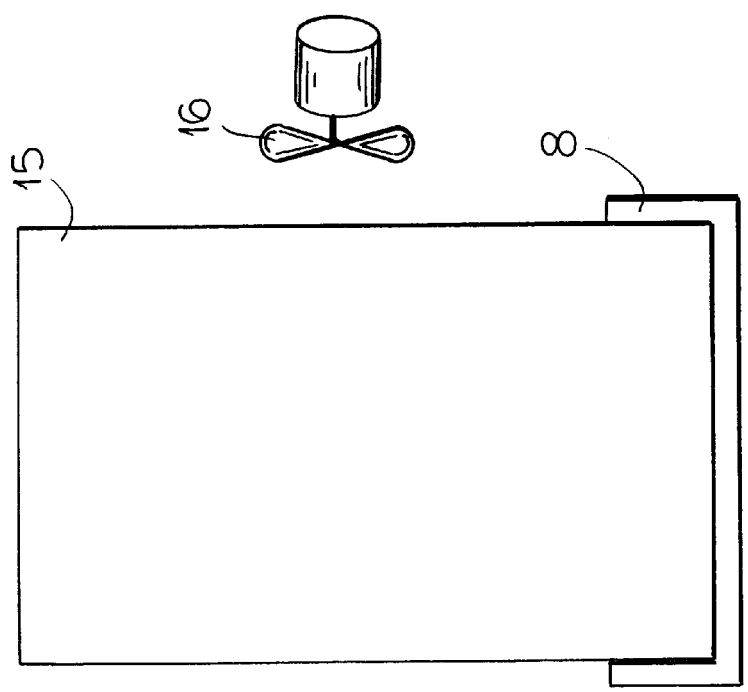

As can be seen from FIG. 3 instead of the ultrasonic nebulizer 9 the tank 8 may be provided with a wick 15 by capillary action draws the sterile water up through the wick where a fan 16 blows the moisture into the room.

Figure 4:
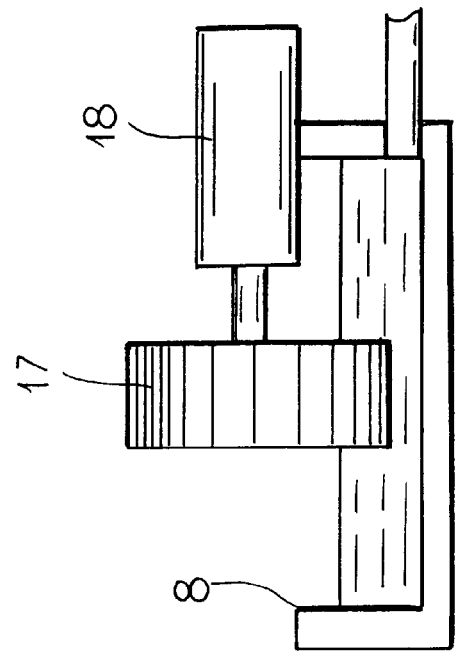

In FIG. 4, the mist is produced by a rotary impeller 17 driven by the motor 18.

Figure 2:
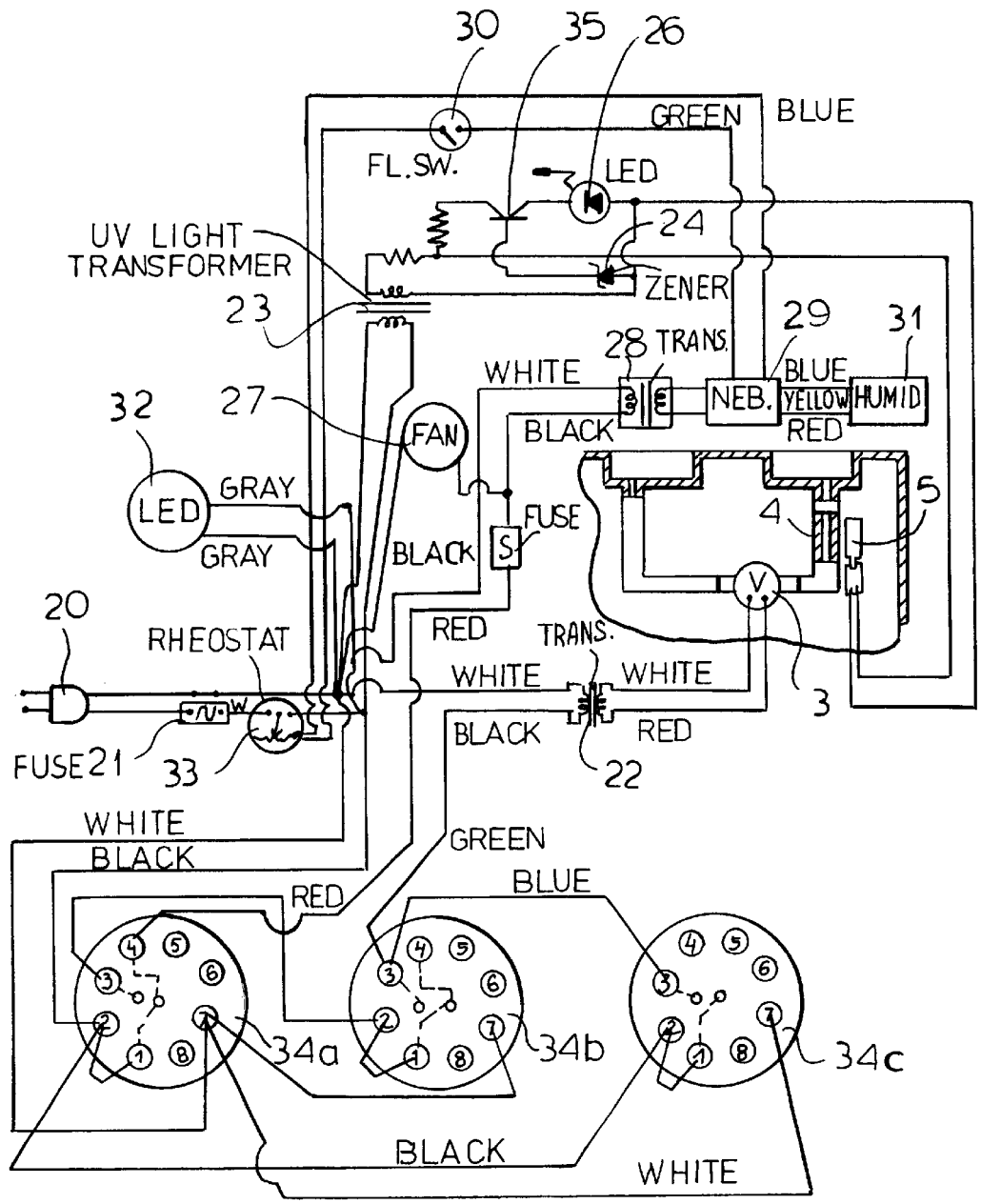

FIG. 2 shows a circuit which can be used for the humidifier of FIG. 1 and this circuit comprises a line 20 which can be connectable to a power source, such as an outlet, and has a fuse 21. The circuit includes a step up transformer 22 which is utilized to operate a normally open solenoid valve 3 so as to close this solenoid valve for the period in which the water in the disinfection chamber 4 is to be subjected to UV light from the lamp 5. The UV lamp 5 is energized by a standard UV light transformer 23 via a voltage control circuit consisting of a zener diode 24 and a transistor 35. An LED 26 can signal failure of the lamp 5. The circuit also includes a fan 27 as has been mentioned previously to assist in distributing the moist air. A nebulizer transformer 28 is connected to the line 20 and operates the nebulizer 29 which can be cut off by a float switch 30 when there is insufficient water in the nebulizer tank 8. A humidistat 31 may also be provided to control the humidity level and an LED 32 can be provided to signal the status of the apparatus. A rheostat 33 can control the nebulizer and switches can be provided as shown at 34a, 34b and 34c for on and off control or for control of the timing of the various operations.

In operation, of course, the valve 3 admits a quantity of water to the chamber 4 and retains that quantity in the chamber for the duration of the exposure to the ultraviolet light and then opens to permit the decontaminated water to enter the chamber 8 from which it is dispersed. Because a static quantity of water is retained in the chamber 4 for the full duration of the germicidal treatment, the extent of the germicidal action can be guaranteed.

A plastic (synthetic resin) of the entire water path can contain a biocide to prevent the growth of bacteria, fungi and other microorganisms and typical of these biocides are those which are marketed under the names "BINYZINE" and "OMADINE". The biocides can be included in any wick which may be employed. The water path may also include individual elements composed of plastic-containing biocides or may have inserts which are impregnated with or include biocides in their compositions.

I have found that the use of a biocide in conjunction with the germicidal UV ensures excellent germ-free operation over the life of the apparatus.

Once the nebulizer tank is filled with the water sterilized by the UV, the normally open solenoid valve 3 is switched off and because the valve remains open, the humidifier then acts like the humidifiers described in the above-mentioned prior patents, i.e. can keep sending sterilized water to the nebulizing chamber as long as the nebulizer is dimensioned so that the rate of evaporation corresponds to or is less than that that can be handled by the UV germicidal lamp and the geometry of the UV chamber.

In this way the valve remains deenergized and stays open until the power is turned off and then on again when the humidifier is restarted. In this case, the valve can be energized only for 5 to 10 minutes during a typical 24 hour operating period and has the advantage of preserving the solenoid coil of the valve whose overheating is a major reason for appliance failures where solenoid valves are used.

I claim:

1. A method of operating a humidifier comprising the steps of:

(a) intermittently feeding a controlled amount of water to a sterilization chamber by timing the inflow of the water to the chamber during operation of the humidifier;

(b) exposing water in said chamber to a sterilization field for a duration and of a magnitude sufficient to inactivate microorganisms in the water in said chamber; and (c) thereafter dispersing the water from said chamber into the surroundings.

2. The method designed in claim 1 wherein the water in said chamber is subjected to ultraviolet light radiation to inactivate said microorganisms.

3. The method defined in claim 1 wherein said water from said chamber is dispersed by ultrasonic nebulization.

4. The method defined in claim 1 wherein said water is dispersed by contacting said water with a rotary impeller.

5. The method defined in claim 1 wherein said water is dispersed by filter evaporation.

6. A humidifier comprising:

a sterilization chamber;

a device for intermittently feeding a controlled amount of water to said sterilization chamber by timing the inflow of the water to the chamber during operation of the humidifier;

a source of a sterilizing field at said chamber for exposing water in said chamber to said sterilization field for a duration and of a magnitude sufficient to inactivate microorganisms in the water in said chamber; and a water disperser connected to said chamber for dispersing the water from said chamber into the surroundings.

7. The humidifier defined in claim 6 wherein the source of the sterilizing field is an ultraviolet light source.

8. The humidifier defined in claim 6 wherein the device is an electromagnetic valve communicating between a source of water and said chamber.

9. The humidifier defined in claim 6 wherein the device is a pump connected between a source of water and said chamber.

10. The humidifier defined in claim 6 wherein the water disperser is an ultrasonic nebulizer.

11. The humidifier defined in claim 6 wherein the water disperser is a rotary impeller.

12. The humidifier defined in claim 6, further comprising timing circuitry connected to said device for controlling a duration of admission of water to said chamber.

13. The humidifier defined in claim 6, further comprising timing circuitry connected to said source for controlling a duration of operation of said source.

14. The humidifier defined in claim 6 wherein said source is an ultraviolet lamp and said chamber surrounds said lamp, said device comprising a solenoid valve upstream of said chamber and between a source of water and said chamber, said humidifier comprising timing circuitry for timing a duration of operation of said valve and a duration of operation of said lamp.

15. The humidifier defined in claim 14 wherein said water disperser is an ultrasonic transducer and said circuitry is connected to said ultrasonic transducer for energizing said transducer upon opening of said valve.

16. The humidifier defined in claim 15, further comprising a base provided with said chamber and on which said lamp, said transducer and said circuitry are mounted, said base being formed with a tank constituting said source of water.

17. The humidifier defined in claim 6 wherein at least one element along the path of said water between said device and a point at which water is dispersed into the surrounding is composed of a material containing a biocide.

18. The humidifier defined in claim 17 wherein said water disperser is a wick and said wick contains said biocide.

19. The humidifier defined in claim 8 wherein said electromagnetic valve is a normally open valve.

* * * * *